(12) United States Patent
Yang et al.

(10) Patent No.: US 12,491,094 B2
(45) Date of Patent: Dec. 9, 2025

(54) STENT FOR TIPS SURGERY

(71) Applicant: Lepu Medical Technology (Beijing) Co., Ltd., Beijing (CN)

(72) Inventors: Zhida Yang, Beijing (CN); Lixin Zhang, Beijing (CN); Zhijia Shen, Beijing (CN); Huijun Zhao, Beijing (CN); Xin Dou, Beijing (CN); Chuan Wang, Beijing (CN); Rencao Chang, Beijing (CN); Xiaojian Liu, Beijing (CN); Yuxin Zhang, Beijing (CN)

( * ) Notice: Subject to any disclaimer, the term of this patent is extended or adjusted under 35 U.S.C. 154(b) by 0 days.

(21) Appl. No.: 19/209,750

(22) Filed: May 15, 2025

(65) Prior Publication Data
US 2025/0276163 A1  Sep. 4, 2025

(30) Foreign Application Priority Data
Oct. 15, 2024  (CN) .......................... 202411435309.3

(51) Int. Cl.
*A61F 2/852* (2013.01)
*A61F 2/07* (2013.01)
(Continued)

(52) U.S. Cl.
CPC ................ *A61F 2/852* (2013.01); *A61F 2/07* (2013.01); *A61F 2/88* (2013.01); *A61M 27/002* (2013.01);
(Continued)

(58) Field of Classification Search
CPC ......... A61M 27/002; A61F 2/852; A61F 2/88; A61F 2002/826; A61F 2/07; A61F 2/82; A61F 2/86; A61F 2/89
See application file for complete search history.

(56) References Cited

FOREIGN PATENT DOCUMENTS

| CN | 109646148 A | 4/2019 |
|---|---|---|
| CN | 114424990 A | 5/2022 |

OTHER PUBLICATIONS

CNIPA 2nd Office Action, Case No. 202411435309.3, dated Dec. 19, 2024, Chinese original, pp. 1-3.
(Continued)

*Primary Examiner* — William H Matthews
(74) *Attorney, Agent, or Firm* — Addison D. Ault; IPGentleman Intellectual Property Services, LLC

(57) ABSTRACT

The present disclosure relates to a stent for a TIPS surgery, including a first stent body and a second stent body. During use, the first stent body sleeves the second stent body, to control a self-expansion range of the second stent body. The first stent body includes first connectors, intermediate connectors, and second connectors. The second stent body is formed by weaving a single strand of memory alloy. The second stent body includes a first segment and a second segment which are connected. The first segment is of a woven spiral structure, and the second segment is of a woven self-locking structure. By arranging the first stent body to include the first connectors, the intermediate connectors, and the second connectors, the first stent body can shorten to a minimal extent in a length direction during expansion. Moreover, the design of the structure, combined with a stainless steel or cobalt-chromium alloy material, facilitates mechanical diameter control and prevents creep deformation within a long period under physiological conditions, thereby effectively improving the stability of the stent for the TIPS surgery.

5 Claims, 4 Drawing Sheets

(51) Int. Cl.
*A61F 2/88* (2006.01)
*A61M 27/00* (2006.01)
*A61L 31/10* (2006.01)

(52) U.S. Cl.
CPC ............. *A61F 2210/0014* (2013.01); *A61F 2220/0025* (2013.01); *A61F 2230/0056* (2013.01); *A61L 31/10* (2013.01); *A61M 2210/1071* (2013.01); *A61M 2210/12* (2013.01)

(56) References Cited

OTHER PUBLICATIONS

CNIPA 2nd Office Action, Case No. 202411435309.3, dated Dec. 19, 2024, English translation, pp. 1-3.

STENT FOR TIPS SURGERY

FIELD

The present disclosure belongs to the technical field of medical instruments, and specifically, to a pressure distribution stent for TIPS.

BACKGROUND

Portal hypertension refers to a disease where the blood flow in a portal venous system is obstructed and stagnated, leading to increased pressure, which in turn causes a series of clinical manifestations including splenomegaly, hypersplenism, esophageal-gastric varices, hematemesis, ascites, etc. Transjugular intrahepatic portosystemic shunt (TIPS), as a method for interventional treatment of the portal hypertension, is gradually becoming a primary clinical approach. The TIPS surgery refers to the establishment of an artificial channel for blood diversion between the intrahepatic portal vein and the hepatic vein through the interventional operation, and connects the high-pressure portal vein to the hepatic vein for diverting a portion of the portal venous blood flow, thereby reducing the portal hypertension, controlling and preventing the rupture and bleeding of the esophageal-gastric varices, and promoting the absorption of ascites.

However, the TIPS surgery has limitations in its application scope, and the risk of hepatic encephalopathy still restricts widespread use of the TIPS surgery. The incidence of the hepatic encephalopathy increases because during the TIPS surgery, the establishment of a shunt channel allows nitrogenous substances in the blood to bypass the liver detoxification process and enter the systemic circulation directly, leading to elevated blood ammonia levels. The increase in blood ammonia concentration disrupts the balance between excitatory and inhibitory neurotransmitters in the brain, manifesting as either mental excitement or inhibition. Therefore, the size of the shunt channel is related to the risk of developing the hepatic encephalopathy. A larger shunt channel increases the likelihood of the hepatic encephalopathy, whereas the shunt channel that is too small may not adequately reduce the portal pressure, potentially leading to recurrent rupture and bleeding of the esophageal-gastric varices. Therefore, people need a stent that can flexibly adjust the size of the shunt channel during or after the surgery, thereby reasonably controlling the size of the shunt channel according to actual conditions, to reduce the portal hypertension while effectively reducing the risk of the hepatic encephalopathy.

SUMMARY

In view of this, the present disclosure provides a stent for a TIPS surgery.

The technical solution adopted by the present disclosure is as follows:

A stent for a TIPS surgery includes a first stent body and a second stent body. During use, the first stent body sleeves the second stent body; to control a self-expansion range of the second stent body.

The first stent body includes: first connectors, intermediate connectors, and second connectors. There are two first connectors, which are located at two ends of the first stent body respectively. The first connectors and the second connectors, as well as the two adjacent second connectors, are connected through the intermediate connectors. Each intermediate connector is of an N-shaped structure which is parallel to the first stent body in an axial direction, and when a diameter size of a first stent is adjusted, length changes of the first stent can be reduced. The first connectors and the second connectors are in an annular shape formed by connecting a plurality of W-shaped units end-to-end. Each W-shaped unit of any one of the first connectors includes one connection point with the corresponding intermediate connector. Each W-shaped unit of any one of the second connectors includes two connection points with the corresponding intermediate connector, where the two connection points are located on an upper side and a lower side of the W-shaped unit respectively.

The second stent body is formed by weaving a single strand of memory alloy. The second stent body includes a first segment and a second segment which are connected. The first segment is of a woven spiral structure, the second segment is of a woven self-locking structure, and the first segment is provided with a coating structure. The coating structure of the first segment includes an inner coating layer, an intermediate layer, and an outer coating layer, and the inner coating layer is made of at least two layers of coating materials.

According to a further optimized technical solution of the present disclosure, the first stent body is made of a stainless steel or cobalt-chromium alloy material, and the second stent body is formed by weaving a single nickel-titanium alloy wire.

According to a further optimized technical solution of the present disclosure, both the inner coating layer and the outer coating layer are made of expanded polytetrafluoroethylene materials, and the intermediate layer is made of fluorinated ethylene propylene.

According to a further optimized technical solution of the present disclosure, a length of the first segment accounts for 50%-90% of an overall length, and a length of the first stent body is 40%-75% of the length of the first segment.

According to a further optimized technical solution of the present disclosure, the intermediate layer is arranged on the first segment of the second stent body through a thermal fusion or bonding process.

The present disclosure has the beneficial effects:

By arranging the first stent body to include the first connectors, the intermediate connectors, and the second connectors, the first stent body can shorten to a minimal extent in a length direction during expansion, with the shortening degree almost negligible. Moreover, the design of the structure, combined with the stainless steel or cobalt-chromium alloy material, facilitates mechanical diameter control and prevents creep deformation within a long period under physiological conditions, thereby effectively improving the stability of the stent for the TIPS surgery.

BRIEF DESCRIPTION OF THE DRAWINGS

The above and other objectives, features, and advantages of the present disclosure are more apparent through the following description of the embodiments of the present disclosure with reference to the accompanying drawings. In the accompanying drawings.

In the figures: A-portal vein; B-hepatic vein; C-intrahepatic puncture;

1—first stent body; 11—first connector; 12—intermediate connector; 13—second connector;

2—second stent body; 21—first segment; and 22—second segment.

DETAILED DESCRIPTION OF EMBODIMENTS

The present disclosure is described below based on embodiments, but the present disclosure is not merely limited to these embodiments. In the detailed description of the present disclosure below, some specific details are elaborated to avoid obscuring the essence of the present disclosure. Well-known methods, processes, flows, and components are not described in detail.

In addition, those of ordinary skill in the art should understand that the accompanying drawings provided herein are for illustrative purposes only and are not necessarily drawn to scale.

Unless explicitly required by the context, "include", "contain", and similar words throughout the specification and the claims should be interpreted as inclusive meanings, rather than exclusive or exhaustive meanings, namely "including but not limited to".

In the description of the present disclosure, it should be understood that the terms "first", "second", etc., are used for descriptive purposes only and should not be construed as indicating or implying relative importance. In addition, in the description of the present disclosure, "a plurality of" means two or more, unless otherwise specified.

Figure 1:
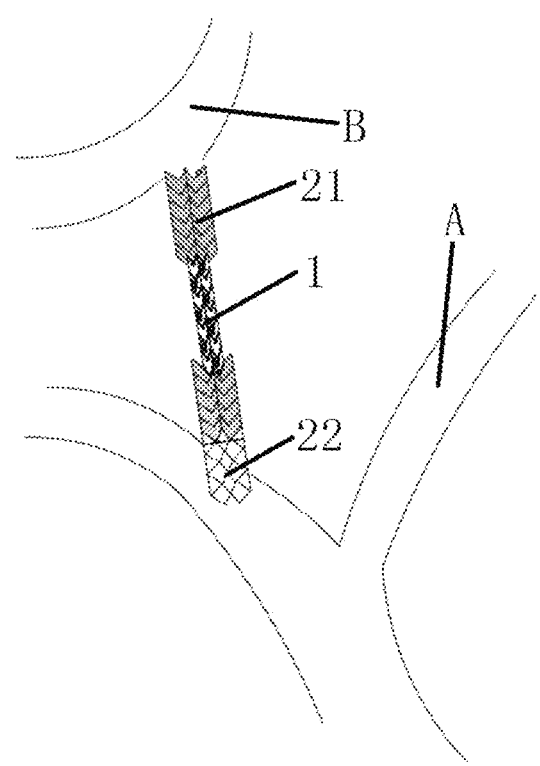
FIG. 1 is a schematic diagram of a structure of a stent for a TIPS surgery in a use state.
Figure 2:
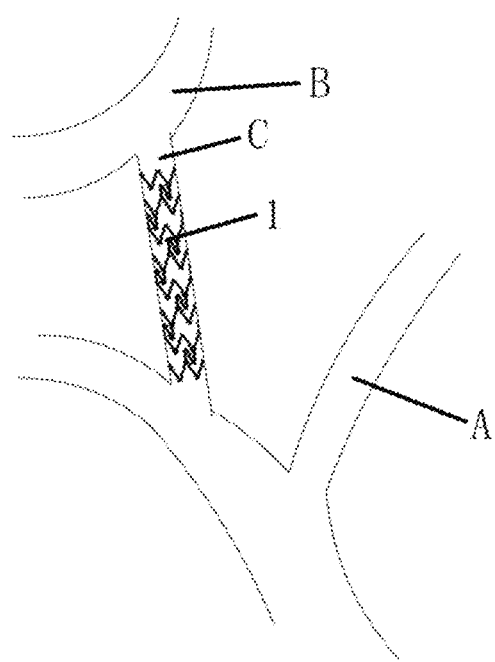
FIG. 2 is a schematic diagram of a structure of a first stent body.
Figure 3:
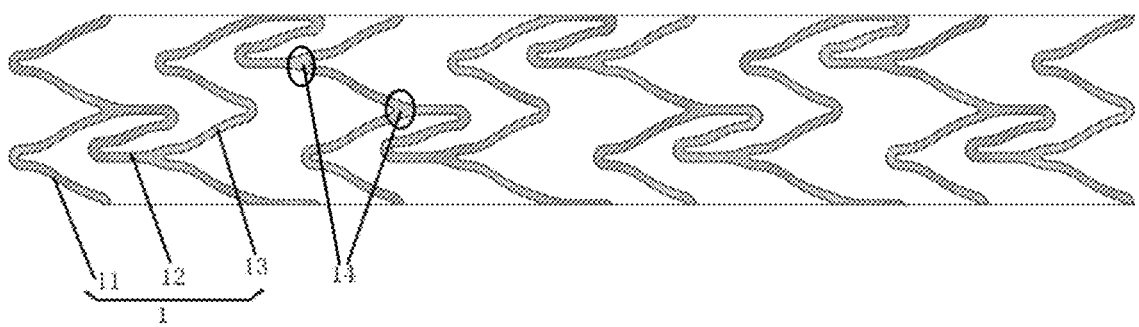
FIG. 3 is a schematic diagram of a structure of introduction of the first stent body.
Figure 4:
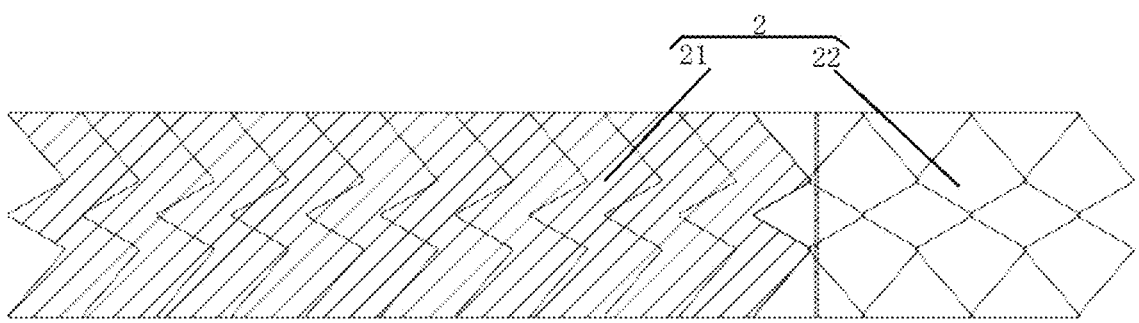
FIG. 4 is a schematic diagram of a structure of a second stent body.

Referring to FIG. 1 to FIG. 4, the present disclosure provides a stent for a TIPS surgery, including a first stent body 1 and a second stent body 2. After deployment, both the first stent body 1 and the second stent body 2 are hollow tubular structures. During use, the first stent body 1 sleeves the second stent body 2. The second stent body 2 is a self-expanding stent that can self-expand to a maximum diameter after release. The first stent body 1 expands under external force, and after expanding to a required diameter, the first stent body 1 is used to restrict a self-expansion range of the second stent body 2. The stent for the TIPS surgery mainly acts on a shunt channel formed by intrahepatic puncture, diverting a portion of portal vein blood into the hepatic vein to reduce portal hypertension. However, since the ammonia content in the hepatic vein blood may trigger hepatic encephalopathy, a stable and flexible mechanically-controlled stent for the TIPS surgery is required.

In the technical solution, the first stent body 1 is designed into three parts: first connectors 11, intermediate connectors 12, and second connectors 13. There are two first connectors 11, which are located at two ends of the first stent body 1 respectively. The first connectors 11 and the second connectors 13, as well as the two adjacent second connectors 13, are connected through the intermediate connectors 12. Each intermediate connector 12 is of an N-shaped structure, which can increase a linear space and ensure an effective length of the shunt channel to the maximum degree. The first connectors 11 and the second connectors 13 are in an annular shape formed by connecting a plurality of W-shaped units end-to-end. Each W-shaped unit of any one of the first connectors includes one connection point 14 with the corresponding intermediate connector 12. Each W-shaped unit of any one of the second connectors 13 includes two connection points 14 with the corresponding intermediate connector 12, where the two connection points 14 are located on an upper side and a lower side of the W-shaped unit respectively. The design of the connection points 14 and the shape allow the first stent body 1 to shorten to a minimal extent in a length direction during expansion, with the shortening degree almost negligible. Moreover, the design of the structure, combined with a stainless steel or cobalt-chromium alloy material, facilitates mechanical diameter control and prevents creep deformation within a long period under physiological conditions, thereby effectively improving the stability of the stent for the TIPS surgery.

It should be noted that the first stent body 1 is made of the stainless steel or cobalt-chromium alloy material through laser cutting. The laser cutting can enhance the stability of the first stent body 1 and ensure that first stent body 1 is a whole structure, thereby ensuring mechanical performance.

The second stent body 2 is formed by weaving a single strand of memory alloy. By selecting a single wire, the single wire may be wound around a distal end of an uncoated segment and then returned to a junction of a coated segment and the uncoated segment, thereby effectively avoiding the exposure of a loose wire end outside the stent, to avoid safety risks during long-term use in a physiological environment. Preferably, the second stent body 2 is formed by weaving a nickel-titanium alloy wire. The second stent body 2 includes a first segment 21 and a second segment 22 which are connected. The first segment 21 is of a woven spiral structure, and by setting the spiral structure with alternating peaks and troughs, the first segment 21 of the second stent body 2 may be more flexible. The second segment 22 is of a woven self-locking or interlocking structure, and the structure can prevent excessive longitudinal elongation of the second segment 22. The first segment 21 is provided with a coating structure. The coating structure of the first segment 21 includes an inner coating layer, an intermediate layer, and an outer coating layer. The inner coating layer is made of at least two layers of coating materials, and by connecting the coating materials to a woven mesh of the first segment 21, flexibility and longitudinal strength can be ensured while bile permeability is reduced. Preferably, both the inner coating layer and the outer coating layer are made of expanded polytetrafluoroethylene materials, and the intermediate layer is made of fluorinated ethylene propylene.

Preferably, a length of the first segment 21 accounts for 50%-90% of an overall length, and a length of the first stent body 1 is 40%-75% of the length of the first segment 21. Through the structure arrangement, stable pressure distribution can be achieved.

Preferably, the intermediate layer is sutured onto the first segment 21 of the second stent body 2, and through a sutured connection, coating stability can be enhanced. Meanwhile, the intermediate layer may also be arranged on the first segment of the second stent body using a thermal fusion or bonding process.

When the stent for the TIPS surgery is used, the first stent body 1 is first introduced into an intrahepatic puncture site through an introduction system. Then, an appropriate supporting balloon is selected to support an inner diameter of the first stent body 1 to a first diameter (an expansion minimum diameter calculated through flow). Then, the second stent body 2 is introduced, and is expanded within the first stent body 1 until the second stent body 2 is fully deployed. During introduction, the second segment 22 of the second stent body 2 can extend out of an intrahepatic puncture channel, thereby completing a preliminary introduction. It should be noted that at least one pressure measurement is performed after the introduction is completed to determine a pressure gradient between the portal vein and the hepatic vein or the inferior vena cava. According to pressure conditions, the diameter size of the first stent body 1 may be adjusted correspondingly. Certainly, a plurality of pressure measurements may also be performed, and the diameter of the first stent body (1) may be adjusted. For example, the pressure measurement may be performed one day, one week, one month, or even longer after the surgery, and the diameter of the first stent body 1 is adjusted according to a measurement result.

An inner diameter (ID) of the first stent body 1 is approximately 6 mm after deployment and can expand to approximately 10 mm. In some examples, the inner diameter of the first stent body 1 may normally expand by 12% to 40%. Certainly, the structure of the first stent body 1 designed in the technical solution may expand by 40% to 70% and remains stable within the range. The length of the second stent body 2 ranges from 6 cm to 12 cm, with a total wall thickness between 0.1 mm and 1 mm.

It should be understood that the above implementations are merely exemplary and not restrictive. Without departing from the fundamental principles of the present disclosure, those skilled in the art may make various obvious or equivalent modifications or substitutions to the above details, all of which shall fall within the scope of the claims of the present disclosure.

We claim:

1. A stent for a TIPS surgery, comprising a first stent body and a second stent body, wherein during use, the first stent body sleeves the second stent body, to control a self-expansion range of the second stent body;

wherein the first stent body comprises first connectors, intermediate connectors, and second connectors, and there are two first connectors, which are located at two ends of the first stent body respectively;

wherein the first connectors and the second connectors, as well as adjacent second connectors, are connected through the intermediate connectors;

wherein each intermediate connector is of an N-shaped structure, which is parallel to the first stent body in an axial direction;

wherein the first connectors and the second connectors are in an annular shape formed by connecting a plurality of W-shaped units end-to-end, and each W-shaped unit of any one of the first connectors comprises one connection point with the corresponding intermediate connector;

wherein each W-shaped unit of any one of the second connectors comprises two connection points with corresponding intermediate connectors, and the two connection points are located on an upper side and a lower side of the W-shaped unit respectively;

wherein the second stent body is formed by weaving a single strand of memory alloy, and the second stent body comprises a first segment and a second segment which are connected, wherein the first segment is of a woven spiral structure, the second segment is of a woven self-locking structure, and the first segment is provided with a coating structure; and wherein the coating structure of the first segment comprises an inner coating layer, an intermediate layer, and an outer coating layer, and the inner coating layer is made of at least two layers of coating materials.

2. The stent for the TIPS surgery according to claim 1, wherein the first stent body is made of a stainless steel or cobalt-chromium alloy material, and the second stent body is formed by weaving a single nickel-titanium alloy wire.

3. The stent for the TIPS surgery according to claim 1, wherein both the inner coating layer and the outer coating layer are made of expanded polytetrafluoroethylene materials, and the intermediate layer is made of fluorinated ethylene propylene.

4. The stent for the TIPS surgery according to claim 1, wherein a length of the first stent body is 40%-75% of a length of the first segment.

5. The stent for the TIPS surgery according to claim 1, wherein the intermediate layer is arranged on the first segment of the second stent body through a thermal fusion or bonding process.

* * * * *